(12) United States Patent
Waller et al.

(10) Patent No.: US 9,839,871 B2
(45) Date of Patent: Dec. 12, 2017

(54) METHOD FOR THE PURIFICATION OF FLUE GAS, FILTER SYSTEM THEREFOR, AND RETROFIT UNIT

(71) Applicant: TURBOFILTER GMBH, Essen (DE)

(72) Inventors: Juergen Waller, Gelsenkirchen (DE); Rainer Bertling, Mettmann (DE)

(73) Assignee: Turbofilter GmbH, Essen (DE)

( * ) Notice: Subject to any disclaimer, the term of this patent is extended or adjusted under 35 U.S.C. 154(b) by 255 days.

(21) Appl. No.: 14/589,074

(22) Filed: Jan. 5, 2015

(65) Prior Publication Data

US 2015/0114225 A1 Apr. 30, 2015

Related U.S. Application Data

(63) Continuation of application No. PCT/EP2013/063902, filed on Jul. 2, 2013.

(30) Foreign Application Priority Data

Jul. 3, 2012 (DE) .......................... 10 2012 105 936

(51) Int. Cl.
 *B01D 53/02* (2006.01)
 *B01D 53/12* (2006.01)
 (Continued)

(52) U.S. Cl.
 CPC ......... *B01D 53/12* (2013.01); *B01D 46/0023* (2013.01); *B01D 46/0036* (2013.01);
 (Continued)

(58) Field of Classification Search
 CPC ...... B01D 2253/102; B01D 2257/2064; B01D 2257/602; B01D 2258/0283; B01D 46/0023; B01D 46/0036; B01D 46/02; B01D 53/0415; B01D 53/06; B01D 53/10; B01D 53/12; F23J 15/02; F23J 2215/301; F23J 2215/60; F23J 2217/104; F23J 2219/30; F23J 2219/60
 See application file for complete search history.

(56) References Cited

U.S. PATENT DOCUMENTS

| 5,288,299 | A | 2/1994 | Yoshida et al. |
| 8,333,827 | B2 | 12/2012 | Bones |
| 8,647,411 | B2 | 2/2014 | Lindau |
| 8,808,434 | B2 | 8/2014 | Lindau |

(Continued)

FOREIGN PATENT DOCUMENTS

| DE | 1757515 A1 | 6/1971 |
| DE | 3706131 A1 | 9/1988 |

(Continued)

*Primary Examiner* — Christopher P Jones
(74) *Attorney, Agent, or Firm* — Laurence A. Greenberg; Werner H. Stemer; Ralph E. Locher

(57) ABSTRACT

A flue gas is cleaned by feeding same to a filtering separator. The filtering separator is accommodated in a housing, and the housing has a pre-filter side ahead of the filtering separator and a clean side following the filtering separator in the flue gas flow direction. A filter element has an adsorbent formed of dust-free spheroidal charcoal on the clean side of the housing. The flue gas flows through the adsorbent in the filter element. Harmful substances from the group including mercury and/or dioxin and/or furan and/or further heavy metals are thereby removed from the flue gas.

8 Claims, 2 Drawing Sheets

(51) Int. Cl.
  *B01D 46/00* (2006.01)
  *B01D 46/02* (2006.01)
  *B01D 53/04* (2006.01)
  *B01D 53/06* (2006.01)
  *F23J 15/02* (2006.01)
  *B01D 53/10* (2006.01)

(52) U.S. Cl.
  CPC ......... *B01D 46/02* (2013.01); *B01D 53/0415* (2013.01); *B01D 53/06* (2013.01); *F23J 15/02* (2013.01); *B01D 53/10* (2013.01); *B01D 2253/102* (2013.01); *B01D 2257/2064* (2013.01); *B01D 2257/602* (2013.01); *B01D 2258/0283* (2013.01); *F23J 2215/301* (2013.01); *F23J 2215/60* (2013.01); *F23J 2217/104* (2013.01); *F23J 2219/30* (2013.01); *F23J 2219/60* (2013.01)

(56) References Cited

U.S. PATENT DOCUMENTS

| | | |
|---|---|---|
| 2004/0074391 A1 | 4/2004 | Durante et al. |
| 2005/0132880 A1 | 6/2005 | Chang |
| 2007/0138444 A1 | 6/2007 | De Ruiter |
| 2009/0320678 A1 | 12/2009 | Chang et al. |
| 2011/0197760 A1* | 8/2011 | Lindau ............... B01D 46/0036 95/11 |

FOREIGN PATENT DOCUMENTS

| | | |
|---|---|---|
| DE | 4326279 A1 | 2/1995 |
| DE | 10034394 A1 | 1/2002 |
| DE | 20 2006 003 674 U1 | 2/2007 |
| DE | 20 2007 018 046 U1 | 2/2009 |
| EP | 0 501 281 A2 | 9/1992 |
| EP | 2 177 254 A1 | 4/2010 |

* cited by examiner

METHOD FOR THE PURIFICATION OF FLUE GAS, FILTER SYSTEM THEREFOR, AND RETROFIT UNIT

CROSS-REFERENCE TO RELATED APPLICATION

This application is a continuation, under 35 U.S.C. §120, of copending international application No. PCT/EP2013/063902, filed Jul. 2, 2013, which designated the United States; this application also claims the priority, under 35 U.S.C. §119, of German patent application No. 10 2012 105 936.5, filed Jul. 3, 2012; the prior applications are herewith incorporated by reference in their entirety.

BACKGROUND OF THE INVENTION

Field of the Invention

The present invention relates to a method for the purification of flue gas by way of a filter system. The flue gas is delivered to a filtering separator which is accommodated in a housing. The housing has, upstream of the filtering separator, a prefilter side and, downstream of the filtering separator, a clean side.

Owing to lower limit values for pollutants in flue gas which is generated, for example, during combustion processes in incineration plants, there is a need to improve further the purification of the flue gas. For this purpose, filter systems are known, which have a filtering separator which may be an integral part of a plurality of purification stages. The filtering separator may be, for example, a fabric filter which is accommodated in a housing and which, for example after a prepurification of the flue gas, filters pollutants out of the flue gas. Such fabric filters may be designed, for example, such that they are cleaned off in discrete-time pressure pulse backwashes.

When incineration plants are in operation, pollutants which comprise, for example, mercury, dioxins, furans and further heavy metals may occur. There is in this case the problem that, as a function of the combustion parameters in the incineration plant, peak quantities of such pollutants in the flue gas may occur, which cannot be retained completely by existing filter systems, particularly by the filtering separator which is accommodated in a housing and has to be cleaned off at discrete-time intervals. The pollutants therefore pass into the atmosphere, and because of current and future regulations this may even cause an incineration plant to be shut down.

German published patent application DE 37 06 131 A1 describes a method for the purification of flue gas by means of a filter system and specifies that pollutants, such as mercury, can be separated by means of activated charcoal, coke or all types of coke products from hard coal or lignite and activated cokes as adsorbents having an adsorbing action. In this case, there is provision whereby the flue gas is conducted through a plurality of heaps of adsorbents which succeed one another and are preferably separated from one another.

It is known from German published patent application DE 43 26 279 A1 that, as a preseparator unit, activated charcoal is injected into the flue gas stream, and the activated charcoal serves as an adsorbent for separating the pollutants in the flue gas. German published patent application DE 100 34 394 A1 likewise describes the injection of activated charcoal into the flue gas stream, at the same time specifying that heavy metals, in particular mercury, can be separated especially advantageously by means of activated charcoals. Disadvantages, however, are that injectable coals, in particular activated charcoals, are highly cost-intensive, and the injected activated charcoal has to be disposed of together with the filtering separator or together with the filter cake detached by pulsation from the filtering separator. This entails a high demand for injectable activated charcoal which can be used only once or can be recirculated to a limited extent and therefore results in high consumption. A method for cleaning off by pulsation filter elements which can form a filtering separator, are accommodated in a housing and subdivide the housing into a prefilter side and a clean side is known from German patent DE 1 757 515.

Moreover, for safety reasons, the quantity of dust-like or pulverulent activated charcoal cannot be increased as desired, since, due to too high an injected activated charcoal fraction, in conjunction with high prevailing temperatures of the flue gas, an explosive atmosphere may be formed. The filtering separator can separate a substantial part of pollutants, but, for example, also of fly ash, out of the flue gas, although residual impurities and residual pollutants, in particular mercury, may still occur on the clean side which is separated from the prefilter side by the filtering separator.

German utility model DE 20 2006 003 674 U1 and its counterpart published patent application US 2007/0138444 A1 describe an activated charcoal which is in the form of spherical activated charcoal and is pourable, abrasion-resistant and dust-free. Moreover, the spheroidal charcoal, as it is known, is distinguished in that it is very hard. Such spheroidal charcoal affords particular advantages for the remaining separation of pollutants which have not been separated in the filtering separator of the filter system, but injection of this activated charcoal into the flue gas stream would entail costs which are too high.

SUMMARY OF THE INVENTION

It is accordingly an object of the invention to provide a flue gas purification method and device which overcomes the above-mentioned and other disadvantages of the heretofore-known devices and methods of this general type and which provides for an improved method for the purification of flue gas; it is a particular object to provide a filter system which allows an improved separation of pollutants, such as mercury and/or dioxin and/or furan and/or further heavy metals.

With the foregoing and other objects in view there is provided, in accordance with the invention, a method of purifying flue gas with a filter system, the method comprising:

providing a filter unit having a housing, a filtering separator in said housing, the housing having a prefilter side upstream of the filtering separator in a flow direction and a clean side downstream of the filtering separator;

providing a filter element being a filter cartridge configured for insertion into and extraction from the housing;

delivering the flue gas to the filtering separator in the housing; and with the filter cartridge inserted in the housing, conducting the flue gas through the filter element having an adsorbent with dust-free spheroidal charcoal disposed on the clean side of the housing, the flue gas flowing from the filtering separator through the dust-free spheroidal charcoal in the filter element uniformly over its area, for separating out of the flue gas pollutants selected from the group consisting of mercury, dioxin, furan, and further heavy metals.

In other words, the invention includes the technical concept that a filter element with an adsorbent having dust-free spheroidal charcoal is arranged on the clean side of the housing, the filter element being designed as a filter cartridge which is inserted into the housing and is extracted from this again, the flue gas flowing from the filtering separator through the dust-free spheroidal charcoal in the filter element uniformly over its area, as a result of which pollutants from the group at least comprising mercury and/or dioxin and/or furan and/or further heavy metals are separated out of the flue gas.

The invention proceeds from the idea that the housing with the filtering separator accommodated in it forms a separate structurally separated filter unit, into which a filter element having an adsorbent is introduced on the clean side as a filtering separator present. Only by the arrangement of the filter element arranged downstream of the filtering separator does it become possible to have an additional separation of pollutants which brings about a remaining separation of pollutants, so that the flue gas, after flowing through the following filter element, is thoroughly purified of pollutants even when peak quantities occur.

Preseparation of pollutants out of the flue gas may take place even in the filtering separator, the filtering separator having a filter action which, although suitable for the preseparation of the pollutants, does not allow a thorough separation of the pollutants when peak quantities of pollutants occur in the flue gas. Only a subsequent filter element on the clean side in the housing of the filter unit ensures that thorough separation of the pollutants becomes possible even when peak quantities of pollutants, for example mercury, occur. Moreover, it is ensured that no odors or only reduced odors can be discharged into the surroundings, although odors arising from the flue gas cannot be separated completely by the filtering separator of the filter unit, especially not in the case of peak quantities of pollutants.

The filter unit with the filtering separator in the housing and with the filter element additionally arranged according to the invention on the clean side may be an integral part of an overall filter unit, and the filter system may have, for example, a preseparator unit, by means of which part of the pollutants is preseparated and/or part of the pollutants being preseparated by means of the filtering separator, so that residual pollutants and, in particular, pollutant quantities occurring with peak values are separated out of the flue gas by the adsorbent of the filter element. Consequently, the filter system with the preseparator unit, with the filtering separator in the housing and with the filter element arranged according to the invention on the clean side in the housing of the filter unit can comprise at least three filter stages.

A further filter stage can be formed if an adsorbent, in particular activated charcoal, coke, hearth furnace coke, lime, hydrated lime and/or sodium bicarbonate, is injected into the flue gas upstream of the filtering separator, that is to say, in particular, before the flue gas enters the housing of the filter unit, so that part of the pollutants is adsorbed upstream of the filtering separator by the activated charcoal, in particular the injected activated charcoal being separated together with the pollutants in the filtering separator. Consequently, the injected adsorbent, formed, for example, by activated charcoal, may form a fourth filter stage which, in particular, is arranged between a preseparator unit and the filter unit. For example, the adsorbent may be added to the flue gas in the fly stream between the incineration plant or a preseparator unit and the filter unit, so that, along the path, the flue gas comes into contact with the adsorbent, so that at least part of the pollutants can be bound from the flue gas by the adsorbent. The injected adsorbent can subsequently be separated, together with the pollutants, by the filtering separator in the housing of the filter unit.

Furthermore, a particular advantage arises if the injection of an adsorbent, for example activated charcoal, into the fly stream is no longer required, in spite of at least temporarily occurring pollutant quantities in the flue gas, for example mercury, and the injection of an adsorbent into the fly stream may possibly cease when, according to the invention, a filter element with an adsorbent is arranged on the clean side of the housing and the flue gas flows through the adsorbent in the filter element. The advantage arises due to the fact that, when the filtering separator is being disposed of or cleaned, activated charcoal laden with pollutants is not a constituent of the separated materials, since the materials separated in the filtering separator are formed essentially from fly ash of the flue gas.

The adsorbent of the filter element, which, according to the invention, is arranged on the clean side of the housing downstream of the filtering separator, is formed from activated charcoal and, in particular, from dust-free spheroidal charcoal, the filter element being designed as a preferably planar filter cartridge, through which flue gas emerging from the filtering separator flows essentially uniformly over its area. For example, the filtering separator may be formed by fabric filters, particularly in the form of filter hoses, filter pockets or filter cells, while at the same time the fabric filters can be cleaned off, in particular, by means of discrete-time pressure pulse backwashes or by scavenging air.

To form the filtering separator, a plurality of fabric filters may be arranged, combined into one or a plurality of filter packs, in the housing of the filter unit, and the flow may pass through the filter hoses, filter pockets or filter cells from the outside inward. The flue gas flowing out of the fabric filters consequently emerges from the fabric filters over their area, and an advantageous arrangement of the filter cartridge, for example with its planar side towards the outflow side of the filter pack or filter packs, has the effect that the flow passes through the adsorbent of the cartridge-shaped filter element uniformly over its area. In this case, any filtering separator, but preferably any filter pack composed of a plurality of individual filtering separators, for example each filter pack composed of a plurality of filter hoses, may be assigned a dedicated filter cartridge on the clean side. If, for example, four, six, eight or more filter packs are present in the housing, then four, six, eight or more filter cartridges may be provided on the clean side in the housing.

The filter cartridge assigned to the filtering separator or to the filter pack composed of a multiplicity of filtering separators may in this case have a filter construction volume which corresponds to about 1% to 50%, preferably 5% to 20% and especially preferably 10% of the filter construction volume of the filtering separator or of the filter pack composed of a multiplicity of filtering separators. If, for example, the filter cartridge lies on its planar side against the outflow side of the filter pack, an identical basic dimension is obtained for the filter pack and the filter cartridge, so that the construction height of the filter cartridge in relation to the length of the filter pack has a ratio of about 1% to 50%, preferably 5% to 20% and especially preferably 10%.

According to a further advantageous exemplary embodiment, the filtering separator in the housing may also be formed by a cyclone filter or by an electrostatic filter, in which case a combination of a plurality of filter types may also be provided, which are arranged in the housing and separate a prefilter side from a clean side.

According to a further advantage, a gassing unit may be provided, by means of which the adsorbent of the filter element is acted upon with compressed gas in order to generate motion in the heaped material of the adsorbent, in particular formed by activated charcoal, the gassing unit preferably being arranged between the filtering separator and the filter element. The gassing unit may act upon the adsorbent of the filter element continuously or in pulses, so that the adsorbent, for example granular or preferably spherical activated charcoal, is kept in continuous motion. The compressed gas may in this case act upon the filter element with or counter to the stream of flue gas. In particular, the filter element may have an upper and a lower cover element, and the cover elements are spaced apart from one another, preferably in parallel, with a clearance, and the heap of adsorbent may possess mobility between the cover elements. This has the effect that the adsorbent is laden uniformly with precipitating pollutants, and there is no loading gradient over the thickness dimension of the filter element through which the flow passes.

The present invention is aimed, furthermore, at a filter system for the purification of flue gas by means of a filtering separator, the filtering separator being accommodated in a housing, and the housing having, upstream of the filtering separator, a prefilter side and, downstream of the filtering separator, a clean side. In this case, according to the invention, a filter element with an adsorbent having dust-free spheroidal charcoal is arranged on the clean side of the housing, the filter element being designed as a filter cartridge which can be inserted into the housing and can be extracted from this again, the flue gas flowing through the dust-free spheroidal charcoal in the filter element, as a result of which pollutants from the group at least comprising mercury and/or dioxin and/or furan and/or further heavy metals can be separated out of the flue gas. The features and advantages of the method described above are likewise taken into account for the filter system according to the invention for the purification of flue gas. In particular, the adsorbent may be formed from activated charcoal, in particular from dust-free spheroidal charcoal according to the above-mentioned German utility model DE 20 2006 003 674 U1 and its counterpart Pub. No. US 2007/0138444 A1.

The filtering separator may be formed from at least one fabric filter, in particular from one and preferably from a plurality of hose-like, pocket-shaped or cellular fabric filters. To clean the filtering separator, a pressure pulse backwash device may be provided, by means of which gas pressure pulses can be generated and by which the fabric filter or fabric filters can be cleaned in discrete-time pressure pulse backwashes.

The filter unit may be constructed such that the clean side is separated from the prefilter side in the housing by an intermediate wall, a plurality of fabric filters being combined in at least one filter pack or being arranged adjacently to the intermediate wall and forming a passage surface into the clean side, the filter element being arranged in front of the passage surface on the clean side. In this case, the passage surface may be smaller than the cross-sectional surface of the housing, so that the intermediate wall serves as a carrier for the filter pack or filter packs and prevents flue gas from going from the prefilter side into the clean side before passing through the filter packs.

Advantageously, further, an accommodating frame may be provided, which is designed to surround the passage surface and in which the filter element is accommodated. The accommodating frame prevents the situation where flue gas may flow past the filter element into the rear region of the clean side, in order ultimately to flow through the filter unit, without passing through the filter element, additionally arranged according to the invention, on the clean side of the housing.

The present invention has also set as one of its goals a retrofit module for retrofitting the above-designated filter unit with a housing, in which a filtering separator is accommodated, so that a prefilter side is formed upstream of the filtering separator and a clean side is formed downstream of the filtering separator, the retrofit module comprising a filter element with an adsorbent having dust-free spheroidal charcoal, which retrofit module is designed to be arranged on the clean side in the housing, and the filter element being designed as a filter cartridge which can be inserted into the housing and can be extracted from this again, and in this case the flue gas can flow from the filtering separator through the dust-free spheroidal charcoal in the filter element uniformly over its area, and the dust-free spheroidal charcoal is designed for separating pollutants from the group at least comprising mercury and/or dioxin and/or furan and/or further heavy metals. Consequently, the retrofit module may be composed at least of the filter element, but, furthermore, of further elements, and existing filter units with a housing in which a filtering separator is accommodated may be retrofitted by means of the retrofit module in such a way that a filter element is arranged on the clean side. In this case, the filter element may have dimensions corresponding to the dimensions of the cross section, through which the flue gas flows in the housing, and the retrofit module comprises, for example, an accommodating frame for the filter element. In particular, the filter element may be designed as a filter cartridge which can be inserted into a receptacle on the clean side of the housing and can also be extracted from this again, for example in order to exchange the filter element.

According to a further design of the retrofit module, the latter may have a module housing which can be arranged on the housing of the filter unit, so that the clean side in the housing of the filter unit can be extended by the volume of the retrofittable module housing. Consequently, in principle, the volume of the clean side of the filter unit does not have to remain unchanged when the filter element according to the invention is subsequently arranged on the clean side. For example, a retrofit module may possess a dedicated housing which is connected spatially and therefore fluidically to the clean side, so that the volume of the clean side of the housing of the filter unit is extended by the volume of the retrofit module. In this case, the volume of the retrofit housing forms an extended part of the clean side, and the flue gas can flow through the module housing of the retrofit module, the flue gas ultimately passing out of the housing, in particular via the module housing of the retrofit module, after the adsorbent has flowed through the filter element. The filter element may be designed as a filter cartridge with an upper and/or lower cover element, where the cover elements comprise a Teflon material or a metal wire screen, and the adsorbent may be accommodated between the cover elements. Due to the hot flue gas, temperatures in the range of up to 250° C. may occur in the filter unit and consequently on the clean side and therefore, to form the filter cartridge, materials are proposed which can withstand these temperatures. For example, the cover elements may be composed of a gas-permeable Teflon material or of a metal wire screen which is sufficiently fine to hold the preferably spherical dust-free activated charcoal between the cover elements, although the gas-permeable Teflon material or the metal wire screen allows the flue gas to flow through the filter cartridge with minimal loss.

The activated charcoal which can be used as adsorbent in the filter element may be formed, according to a preferred exemplary embodiment, from spherical activated charcoal (spheroidal charcoal), and the spherical activated charcoal may be composed of preferably spherical activated charcoal particles having a size of 0.01 mm to 20 mm, preferably of 0.05 mm to 15 mm, preferably of 0.1 mm to 10 mm, further preferably of 0.2 mm to 5 mm and most preferably of 0.3 mm to 2.5 mm. Moreover, the spherical activated charcoal may have and/or be impregnated with sulfur doping and/or bromine doping and they have microporosity and a large active surface. The adsorption properties of activated charcoal in spheroidal form can be improved by impregnation with, for example, catalysts, such as enzymes or metals. For example, the adsorbent may also be a constituent of a permeable composite barrier layer according to German utility model DE 20 2007 018 046 U1 and its counterpart U.S. Pat. No. 8,333,827 B2.

Other features which are considered as characteristic for the invention are set forth in the appended claims.

Although the invention is illustrated and described herein as embodied in a method and filter system for purifying flue gas, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
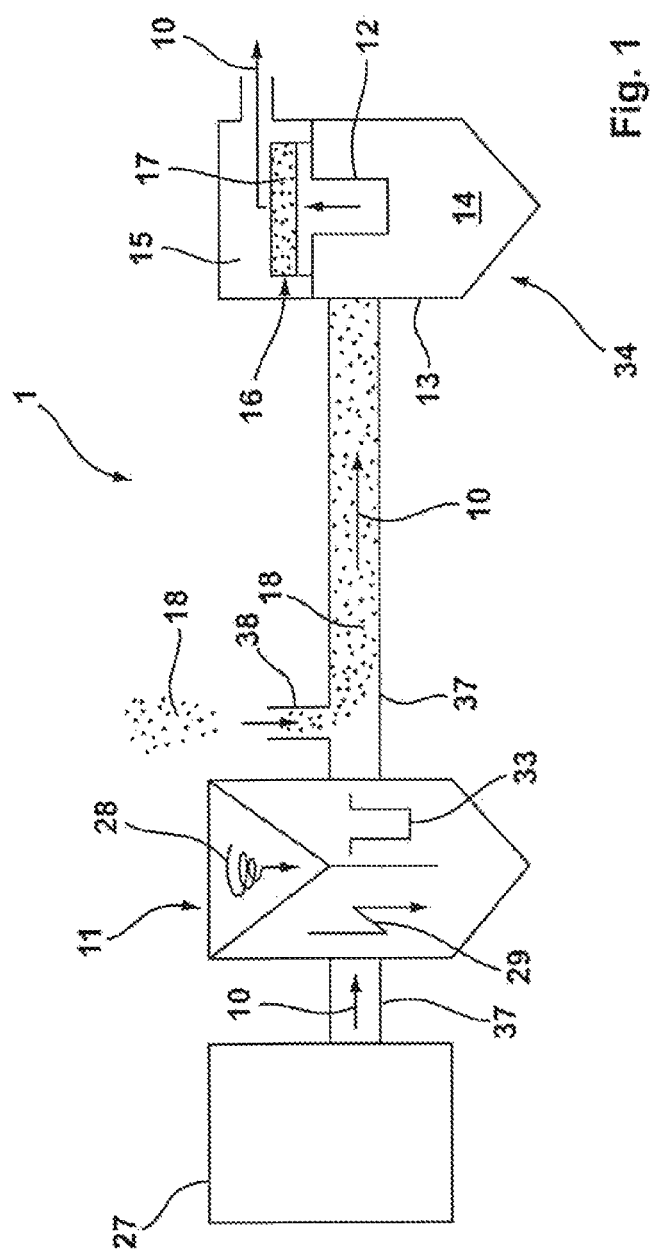
FIG. 1 shows a diagrammatic view of a filter system with a preseparator unit and with a filter unit, in which, according to the invention, a filter element is introduced.

Referring now to the figures of the drawing in detail and first, particularly, to FIG. 1 thereof, there is shown a diagrammatic view of a filter system 1 for the purification of flue gas 10 which is routed, for example, out of an incineration plant 27. The incineration plant 27 may be, for example, a plant for garbage incineration. The flue gas 10 is delivered via a pipeline 37, for example, first to a preseparator unit 11. The preseparator unit is shown, by way of example, as a cyclone separator 28, as an electrostatic separator 29 or as a fabric filter separator 33, and in this case one of the separator construction types 28, 29 or 33 may form the preseparator unit 11, but there is, furthermore, the possibility that the preseparator unit 11 is also formed from a plurality of the separator construction types 28, 29 or 33 shown. In this case, the flue gas 10 may, for example, flow in succession through various separators 28, 29 or 33. After the flue gas 10 has emerged from the preseparator unit 11, it is routed further on via the pipeline 37 to a filter unit 34 formed by a housing 13 into which the flue gas 10 flows. For further separation of pollutants out of the flue gas 10, the possible injection of an adsorbent 18, which can be formed, for example, by activated charcoal, is shown in the pipeline 37 between the preseparator unit 11 and the filter unit 34. The activated charcoal 18 is in this case injected into the flue gas 10 via an orifice 38 in the pipeline 37, so that the activated charcoal 18 is moved in accompaniment with the flue gas 10 and is held in the fly stream. The injected adsorbent 18 may be formed from activated charcoal 18, but also from coke, hearth furnace coke, lime, hydrated lime or sodium bicarbonate.

The flue gas 10 passes, together with the injected adsorbent 18, into the housing 13 of the filter unit 34. The housing 13 is divided into a prefilter side 14, into which the flue gas 10 flows and may possibly carry, in addition to the adsorbent 18, further pollutants. A further part of the housing 13 is formed as the clean side 15. A filtering separator 12 separates the prefilter side 14 from the clean side 15. The device 12 may be a fabric filter 12. The flue gas 10 flows through the fabric filter 12 and thus passes from the prefilter side 14 into the clean side 15, as a result of which further dust and pollutants and also the adsorbent 18 are retained by the filtering separator 12.

Finally, the filter element 16 according to the invention is arranged on the clean side 15 of the fabric filter 12 and comprises an adsorbent 17 which is formed, for example, as a heap of spherical dust-free activated charcoal 17. In this case, the flue gas flows through the filter element 16 completely until it finally leaves the housing 13 from the clean side 15 via an outlet. The filter element 16 on the clean side 15 of the housing 13 brings about a remaining separation of pollutants which may comprise materials from the group comprising at least mercury and/or dioxin and/or furan and/or further heavy metals. Particularly when peak quantities of pollutants are temporarily present in the flue gas 10 as a result of processes in the incineration plant 27, the injected adsorbent 18 cannot be separated completely by means of the preseparator unit 11 and the large fraction of pollutants by means of the filtering separator 12 of the filter unit 34. Consequently, the following filter element 16 comes in useful particularly when residues of pollutants, in particular of mercury, are present in the flue gas.

Figure 2:
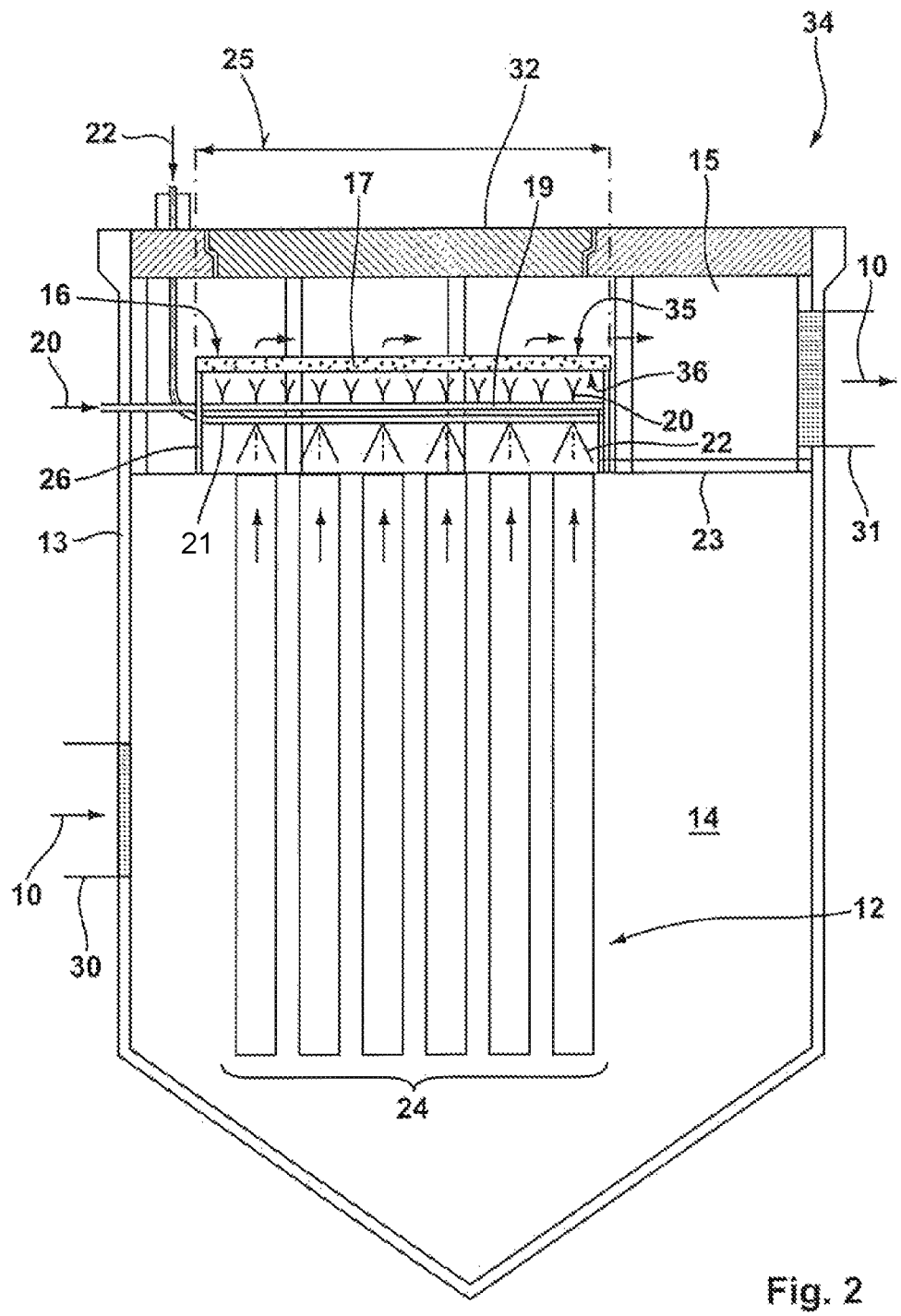
FIG. 2 shows as a detail a view of the filter unit with a filter element which is arranged on the clean side in the housing of the filter unit.

FIG. 2 shows as a detail view of the filter unit 34 with a housing 13 having an inlet 30 into which the flue gas 10 flows. In this case, the flue gas 10 passes into the prefilter side 14 which is separated from a clean side 15 of the housing 13 by an intermediate wall 23. Located on the prefilter side 14 is a filtering separator 12 comprising fabric filters 12 which are designed as filter hoses. The filter hoses are oriented parallel to one another and so as to run vertically and form a filter pack 24, the flow passing through the filter hoses of the fabric filters 12 from the outside inward. Finally, after the flue gas 10 has flowed through the fabric filters 12, the flue gas 10 can pass through a passage surface 25 through the intermediate wall 23, the filter pack 24 shown being arranged on the intermediate wall 23. In this case, only a single filter pack 24 is illustrated, although a plurality of filter packs 24 composed of a multiplicity of fabric filters 12, through which the flue gas 10 in each case flows equally, may be arranged on the intermediate wall 13. The fabric filters 12 can be cleaned off by means of gas pressure pulses 22, the gas pressure pulses 22 forming pressure pulse backwashes which act opposite to the direction of flow of the flue gas 10. The gas pressure pulses 22 may, for example, be activated at discrete-time intervals, in order to clean off the filter cake occurring on the outside of the fabric filters 12.

According to the invention, above the passage surface 25 of the fabric filters 12 forming the filter pack 24, there is arranged a filter element 16, which is designed as a filter cartridge 16 and which is accommodated in an accommodating frame 26. The accommodating frame 26 closes the side region between the intermediate wall 23 and the filter cartridge 16, so that the flue gas 10, after passing through the fabric filters 12, flows completely through the filter element 16. The flue gas 10, after passing through the filter element 16, subsequently emerges from the clean side 15 of the housing 13 through an outlet 31 out of the housing 13 and, if appropriate, into following system parts.

The filter cartridge 16 is of planar form and is oriented parallel to the intermediate wall 23 and held by the accommodating frame 26. The filter cartridge 16 has an upper cover element 35 and a lower cover element 36, and an adsorbent 17 which is formed by activated charcoal 17 is accommodated between the cover elements 35 and 36. In this case, the heap of adsorbent 17 may be such that it can move between the cover elements 35 and 36. In order to generate motion, a compressed gas 20 is provided, which can flow onto the filter cartridge 16 approximately uniformly over its area, so that the adsorbent 17 is moved between the cover elements 35 and 36. For example, motion may be brought about by the injected compressed gas 20 and the counteracting gravity of the adsorbent 17, so that the flow force of the compressed gas 20 acts counter to the gravity of the adsorbent 17. Uniform loading of the adsorbent 17 in the filter cartridge 16 with pollutants can consequently be brought about, without a loading gradient from the lower cover layer 36 to the upper cover layer 35 being formed in the adsorbent 17.

In order to provide exchangeability of the filter cartridge 16, the upper region of the housing 13 has a removable lid element 32, and when the lid element 32 is removed the filter cartridge 16 can be extracted from the accommodating frame 26 through an orifice formed in the housing 13 and be replaced, for example, by a new filter cartridge 16. In particular, the filter unit 34 can be modified by means of the removable lid element 32 such that the filter element 16 can be designed as an integral part of a retrofit module for retrofitting the filter unit 34. For example, an existing filter system 1 having a filter unit 34 can be retrofitted with a filter element 16 on the clean side 15 of the filter unit 34, in order to separate pollutants, in particular mercury, in the flue gas 10 of an incineration plant 27. Consequently, the use of a filter element 16 on the clean side 15 of the housing 13 can replace the injection of an adsorbent 18 into the flue gas 10 before the flue gas 10 enters the housing 13.

The invention is not restricted in its implementation to the merely preferred exemplary embodiment indicated above. On the contrary, a number of variants may be envisaged, which make use of the illustrated solution even in the case of versions which are of a fundamentally different type. All the features and/or advantages, including structural particulars or spatial arrangements, which become apparent from the claims, the description or the drawings may be essential to the invention both in themselves and in the most diverse possible combinations. In particular, the arrangement according to the invention of a filter element 16 downstream of a filtering separator 12 in a housing 13 may also have a dedicated housing, and if the flue gas 10 flows out of the clean side 15 of the housing 13 shown and a further housing follows, this further housing will likewise form a clean side 15 of the filtering separator 12. The direct arrangement of a filter element 16 with an adsorbent 17 on the clean side 15 of the housing 13 in which the filtering separator 12 is arranged therefore constitutes merely a preferred exemplary embodiment.

The following is a summary list of reference numerals and the corresponding structure used in the above description of the invention:

1 Filter system
10 Flue gas
11 Preseparator unit
12 Filtering separator, fabric filter
12a Filter hose
13 Housing
14 Prefilter side
15 Clean side
16 Filter element, filter cartridge
17 Adsorbent, spheroidal charcoal
18 Adsorbent, activated charcoal
19 Gassing unit
20 Compressed gas
21 Pressure pulse backwash device
22 Gas pressure pulse
23 Intermediate wall
24 Filter pack
25 Passage surface
26 Accommodating frame
27 Incineration plant
28 Cyclone separator
29 Electrostatic separator
30 Inlet housing
31 Outlet housing
32 Removable lid element
33 Fabric filter separator
34 Filter unit
35 Upper cover element
36 Lower cover element
37 Pipeline
38 Orifice

The invention claimed is:

1. A method of purifying flue gas with a filter system, the method comprising:
   providing a filter unit having a housing, a filtering separator in said housing, the housing having a prefilter side upstream of the filtering separator in a flow direction and a clean side downstream of the filtering separator;
   providing a filter element being a filter cartridge configured for insertion into and extraction from the housing;
   delivering the flue gas to the filtering separator in the housing;
   injecting an adsorbent into the flue gas upstream of the filtering separator for causing part of the pollutants to be adsorbed by the adsorbent upstream of the filtering separator;
   with the filter cartridge inserted in the housing, conducting the flue gas through the filter element having a filter element adsorbent with dust-free spheroidal activated charcoal disposed on the clean side of the housing, the flue gas flowing from the filtering separator through the dust-free spheroidal charcoal in the filter element uniformly over its area, for separating out of the flue gas pollutants selected from the group consisting of mercury, dioxin, furan, and further heavy metals;
   preseparating part of the pollutants in a preseparator unit arranged outside the housing and/or preseparating part of the pollutants by way of the filtering separator, so that residual pollutants and pollutant quantities occurring with peak values are separated out of the flue gas by the filter element adsorbent;
   providing a gassing unit disposed between the filtering separator and the filter element and subjecting the filter element adsorbent to compressed gas for generating motion in the material of the adsorbent.

2. The method according to claim 1, which comprises separating the injected adsorbent in the filtering separator.

3. The method according to claim 1, which comprises injecting the adsorbent before the flue gas enters the housing.

4. The method according to claim 1, which comprises injecting an adsorbent selected from the group consisting of activated charcoal, coke, hearth furnace coke, lime, hydrated lime, and sodium bicarbonate.

5. The method according to claim 1, wherein the filtering separator is formed by at least one fabric filter and the fabric filter is cleaned by way of discrete-time pressure pulse backwashes or by scavenging air.

6. The method according to claim 5, wherein the filtering separator is formed of filter hoses, filter pockets or filter cells.

7. A method of purifying flue gas with a filter system, the method comprising:
providing a filter unit having a housing, a filtering separator in said housing, the housing having a prefilter side upstream of the filtering separator in a flow direction and a clean side downstream of the filtering separator;
providing a filter element being a filter cartridge configured for insertion into and extraction from the housing;
delivering the flue gas to the filtering separator in the housing; and
with the filter cartridge inserted in the housing, conducting the flue gas through the filter element having an adsorbent with dust-free spheroidal charcoal disposed on the clean side of the housing, the flue gas flowing from the filtering separator through the dust-free spheroidal charcoal in the filter element uniformly over its area, for separating out of the flue gas pollutants selected from the group consisting of mercury, dioxin, furan, and further heavy metals;
providing a gassing unit and subjecting the adsorbent of the filter element to compressed gas for generating motion in the material of the adsorbent.

8. The method according to claim 7, wherein the adsorbent is formed of activated charcoal and the gassing unit is arranged between the filtering separator and the filter element.

* * * * *